United States Patent [19]

Gage

[11] 3,743,162
[45] July 3, 1973

[54] FRICTION WELDING BRAKE SYSTEM
[75] Inventor: Arthur F. Gage, Warren, Mich.
[73] Assignee: North American Rockwell Corporation, Pittsburgh, Pa.
[22] Filed: Jan. 27, 1971
[21] Appl. No.: 110,221

[52] U.S. Cl............... 228/2, 29/470.3, 156/73, 303/13
[51] Int. Cl............................................ B23k 27/00
[58] Field of Search ............... 303/13, 14; 228/2; 29/470.3; 156/73

[56] References Cited
UNITED STATES PATENTS
3,582,150  6/1971  Williams........................... 303/13 X
3,234,646  2/1966  Hollander et al.................. 228/2 X Primary Examiner—J. Spencer Overholser
Assistant Examiner—Robert J. Craig
Attorney—John R. Bronaugh, Floyd S. Levison, E. Dennis O'Connor and Richard A. Speer

[57] ABSTRACT

An apparatus for frictionally welding two workpieces together including drive means for rotating one of said workpieces and braking means associated with the drive means. The braking means is operable in two modes of operation, a normal slow mode as required by a particular weld cycle, and an emergency mode of operation in which the full braking force is applied to brake as fast as possible.

4 Claims, 4 Drawing Figures

INVENTOR.
ARTHUR F. GAGE

INVENTOR
ARTHUR F. GAGE

FRICTION WELDING BRAKE SYSTEM

BACKGROUND OF THE INVENTION

This invention relates generally to a friction welding apparatus by which two relatively rotating workpieces are frictionally welded together, and more particularly to a novel braking system incorporated in such an apparatus and operable in two modes of operation for stopping the relative rotation between the workpieces either during a normal welding cycle or under emergency conditions.

The braking system disclosed herein is essentially an improvement over that incorporated in the friction welding apparatus disclosed in U.S. Pat. application Ser. No. 753,214, filed on aug. 16, 1968, which application is assigned to the assignee of this invention. In all other respects, the friction welding apparatus disclosed herein, and its method of operation, are basically the same as those described in application Ser. No. 753,214.

Friction welding apparatus of the type with which the invention is concerned is especially adapted for the friction welding of relatively heavy workpieces, such as the center section and wheel bearing end spindles of a vehicle axle housing. During a typical welding cycle, the rotating end spindles are axially accelerated towards opposite ends of the center section which is held against rotation and are then decelerated as they approach the center section so that they gently contact the center section. The axial thrust urging the rotating end spindles against the center section is abruptly and materially increased immediately upon contact between the end spindless and center section and then gradually increased from the abruptly increased thrust level. As the axial thrust is increased, the friction between the relatively rotating end spindles and enter section generates a large amount of heat which renders the material plastic at the contacting surfaces. Rotation of the end spindles is then stopped, and the axial thrust is again abruptly increased to a much higher level and maintained at this level until the welds, which are formed when the end spindles stop rotating, have cooled. As illustrated in Ser. No. 753,214, a rather elaborate control and sequencing circuit is provided for controlling the overall operation of the friction welding apparatus.

In existing machines, such as that illustrated in Ser. No. 753,214, problems were created by the manner in which rotation of the end spindles was stopped during the welding cycle. A brake control mechanism, which was part of the overall control sequencing circuit for the machine, was capable of functioning in only one mode of operation in increasing braking force to the maximum level on the drive system of the end spindles. The predetermined rate at which the braking force was increased to the maximum level necessarily represented a compromise between a relatively high force increase rate desired during emergency conditions and a lower force increase rate required under normal welding cycle conditions. Consequently, because the brake control mechanism could operate only in a single mode, the predetermined braking force increase rate during a normal welding cycle was much higher than that which would normally be required, and when the brake was applied, shock was applied to the entire drive system of the spindles. Quite often, some of the drive components, such as the drive shaft, bearings, etc., were placed under duress thus exposing these parts to potential failure. In addition, when an emergency did arise, the rate at which the rotating spindles and drive system were stopped was not fast enough.

SUMMARY OF THE INVENTION

Accordingly, a primary object of this invention resides in the provision of a friction welding apparatus which includes a novel braking system capable of functioning in two modes of operation, a normal slow mode of operation employed during a normal welding cycle, and an emergency fast mode of operation employed only under emergency conditions.

Still another object of this invention resides in the provision of a novel brake mechanism employed for stopping relative rotation between two workpieces, such as the end spindles and center section of a vehicle axle, wherein the brake mechanism is operable in a slow or soft mode to provide a first rate of increase of braking force of a given maximum level, or alternately, in a second emergency fast mode, to provide a second rate of increase of braking force to attain the maximum level in a shorter period of time. Such a brake mechanism advantageously provides, during a normal operating cycle, only that much braking which is required to stop the relative rotation within an acceptable time period, e.g., a fraction of a second, without damaging the drive components of the apparatus, and also assures, should emergency conditions arise, that there is a quickly applied braking force available to stop relative rotation at a rate greater than that attainable during a normal cycle.

Still another object of this invention resides in the provision of a novel brake control mechanism for a friction welding apparatus, wherein the brake control mechanism is operable in a normal slow mode of operation, or alternately, in an emergency faste mode of operation. The rate of application of the maximum braking force during the normal slow mode of operation is sufficient to stop the rotating drive system for the apparatus within an acceptable period of time without damaging any machine components, and is adjustable via a variable flow restrictor as desired. Under the emergency conditions, a very high rate of application of the maximum braking force is applied to the drive system to terminate its operation as fast as possible. Because of the two modes of operation permitted by the brake control mechanism of the invention, no compromise need be made in the level of the rate of application of braking force during either normal or emergency conditions.

Further objects and advantages of this invention will appear as the description proceeds in connection with the appended claims and annexed drawings, wherein like elemens are indicated by like numerals.

DETAILED DESCRIPTION OF THE INVENTION

Figure 1:
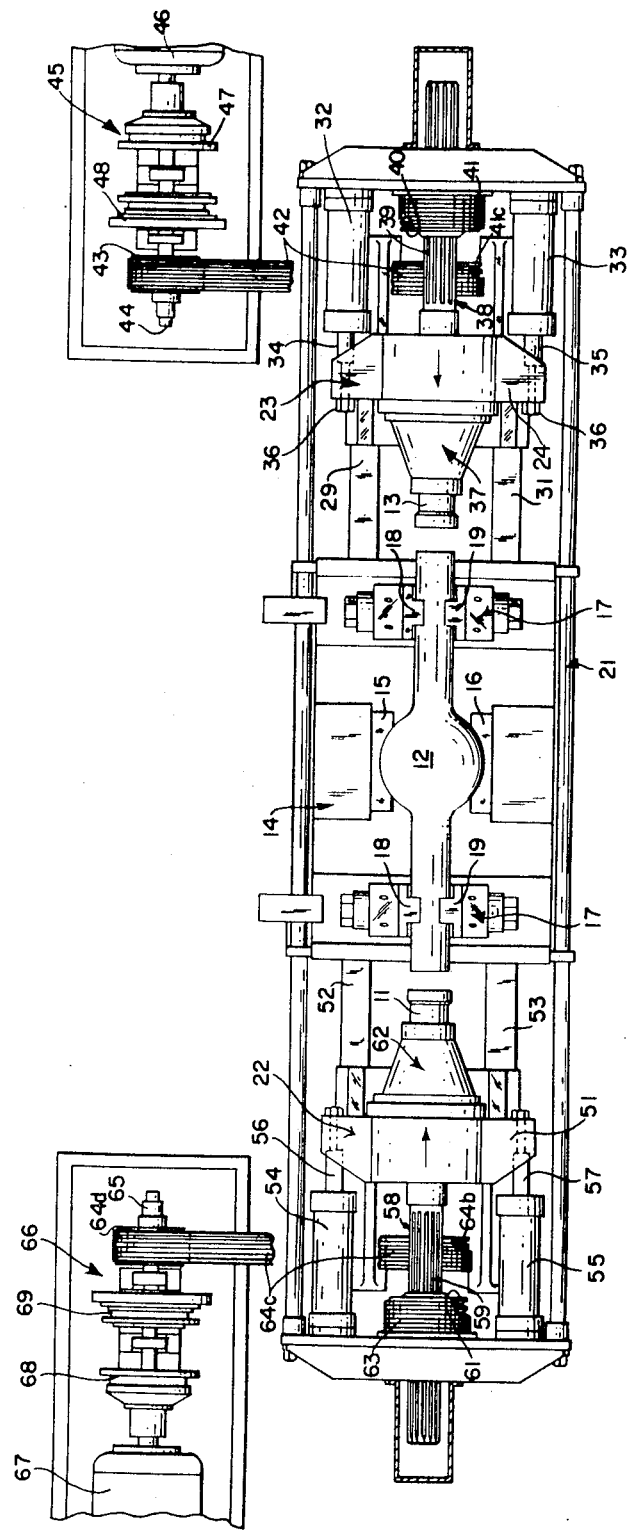
FIG. 1 is a top plan view illustrating a friction welding apparatus of the type within which the brake control mechanism of the invention may be incorporated.

FIG. 1 illustrates a friction welding apparatus of the type in which the brake control mechanism of the invention is to be incorporated. The welding apparatus may be identical to that illustrated in Ser. No. 753,214, to which reference may be had for a more detailed explanation of the structure and operation of the apparatus. In this type of machine, three workpieces 11, 12 and 13 are adapted to be friction-welded together. The central workpiece 12, which may be an axle housing center section, is held stationary and the other two workpieces, which may be wheel bearing spindles 11 and 13 are rotated while being moved into contact with opposite ends of workpiece 12.

The central workpiece 12 is mounted in a cradle structure 14 wherein opposite sides are engaged and held suitably by adjustable jaws 15 and 16. The oppositely extending arms of workpiece 12 are clamped tightly into similar fixtures 17, each of which has opposed adjustable jaws indicated at 18 and 19 for gripping the workpiece. This arrangement supports and anchors workpiece 12 against rotation or axial displacement. Cradle 14 is secured rigidly to machine base 21 during operation.

Workpiece 11 is mounted upon a hydrostatic bearing unit carrier 22 and workpiece 13 is mounted upon a similar hydrostatic bearing unit carrier 23 at opposite ends of base 21. These carriers 22 and 23 and the bearing units on them are essentially the same.

A pair of power cylinders 32 and 33 are fixed on base 21 with piston rods 34 and 35 respectively projecting parallel and at the same level into rigid connection with carrier frame 24. Fasteners such as nuts 36 firmly secure piston rods 34 and 35 to frame 24. Introduction of fluid under pressure into both cylinders 32 and 33 will advance the carrier and the bearing unit cartridge 37 thereon toward the stationary workpiece 12.

A shaft 38, located centrally of carrier 23 and midway between cylinders 32 and 33, has a splined section 39 which axially slidably extends through the hub of an axially stationary pulley 40. Pulley 40 is non-rotatably drive connected to shaft 38 through the splined drive connection and is rotatably driven from an idler shaft (not shown) on which another pulley 41c is fixedly mounted.

A belt 42 connects 41c to a pulley 43 fixed on the output shaft 44 of a driving power assembly 45 consisting essentially of an electric motor 46 connected to shaft 44 through a clutch unit 47 and having a braking unit 48 associated therewith. The braking unit may be a conventional air-operated, disc-type brake assembly that is controlled by the novel brake control mechanism described hereinafter.

Shaft 38 extends through the hydrostatic bearing unit cartridge 37 and is operably drive connected to the inserted workpiece 13. Shaft 38 may be continuously rotated as the carrier is axially displaced along guide rails 29 and 31.

Assembly housing carrier 22 is slidably mounted on the machine frame guide rails 52 and 53, which are in parallel alignment with rails 29 and 31, and displacement of carrier 22 is controlled by parallel fluid cylinders 54 and 55 connected by the piston rods 56 and 57, respectively, to housing 51. The shaft 58, having a splined section 59 axially slidably extending through a pulley 61, extends into the bearing unit cartridge 62 to be connected to rotating workpiece 11.

Pulley 61 is non-rotatably drive connected to shaft 58 by the splined drive connection provided by section 59 and due to the splined connection, rotating drive to the pulley is not interrupted as the carrier 22 moves along the support structure.

Pulley 61 is drive connected by a belt 63 to an idler shaft (not shown) on which another pulley 64b is fixedly mounted. A belt 64c drives pulley 64b from another pulley 64d, which is mounted on the output shaft 65 of an independent power unit 66 that comprises an electric motor 67 connected to the shaft 65 through a clutch 68, with another disc brake assembly 69 associated with shaft 65 to brake the drive system 66 when required.

All of the above described friction welding apparatus is set out in more detail in application Ser. No. 753,214 and like numerals have been employed to indicate like elements for purposes of clarity.

As mentioned previously, it is desirable that the brake control mechanism for operating each of the disc brake assemblies 48 and 69 be operable in two modes, a first normal soft braking mode having a lower rate of increase of braking force applied to the drive shafts 44 and 65 of drive systems 45 and 66 respectively, and a second fast emergency mode in which a much higher rate of increase braking force is applied to the shafts until the maximum braking force is reached to stop them at a much faster rate.

Figure 2:
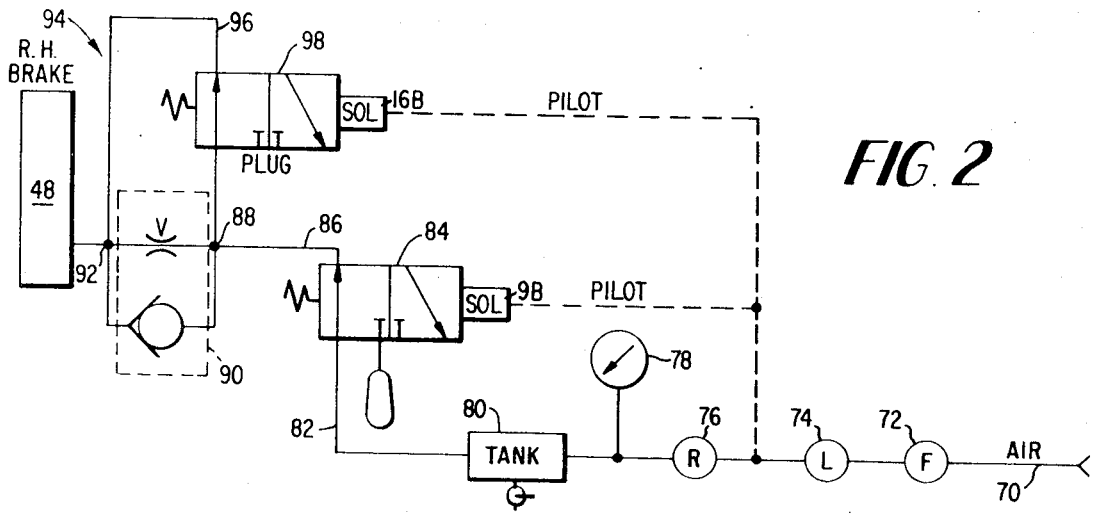
FIG. 2 is a diagrammatic view of the novel pneumatic control circuit of the invention employed for actuating the conventional, pneumatically operated brakes by which a braking force is applied suitably to the drive systems of the rotating spindles in either a normal, slow mode of operation, or a fast emergency mode of operation.
Figure 3:
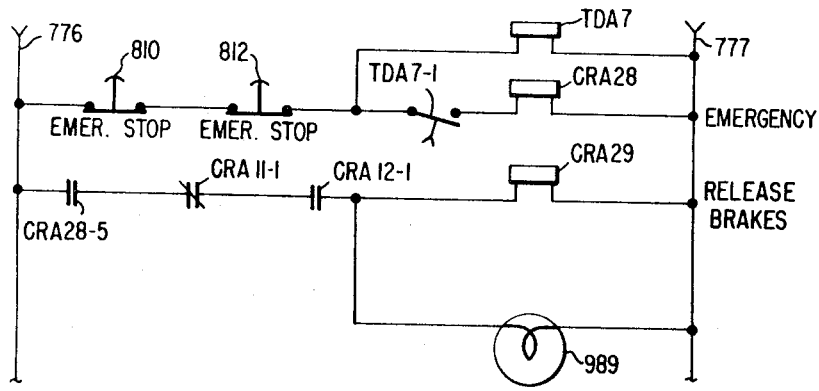
FIGS. 3 and 4 diagrammatically illustrate the brake control electrical circuity which is part of the overall control and sequencing circuit for operating the apparatus of FIG. 1.
Figure 4:
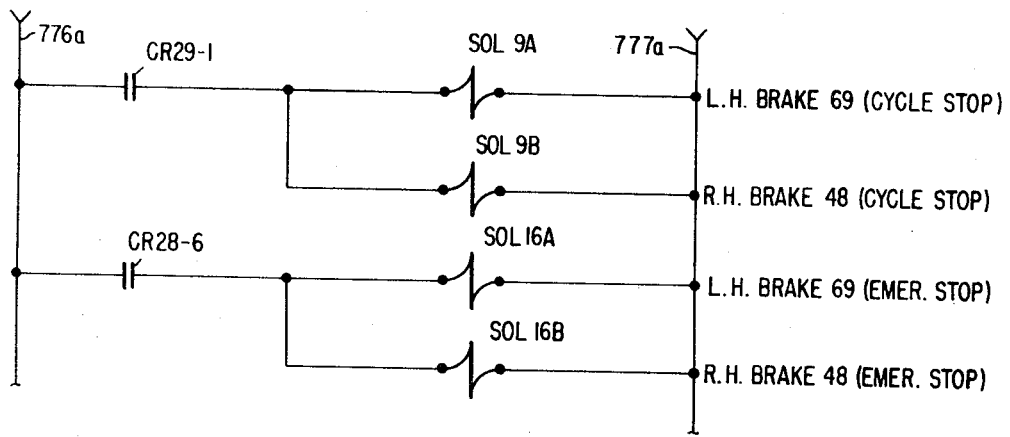

The pneumatic brake control system which is associated with each of the brake systems of 48 and 69 is shown schematically in FIG. 2 and the electrical control circuits operating the solenoid valve components of the control system of FIG. 2 are shown schematically in FIGS. 3 and 4. The brake control circuitry of FIGS. 3 and 4 are, of course, merely part of the overall sequence control system of the welding apparatus such as that shown in FIGS. 14a through 14g in application Ser. No. 753,214, and, for purposes of clarity, only the brake circuitry is shown herein.

Each of the brake assemblies 48 and 69 will have associated therewith a pneumatic control system such as that shown in FIG. 2, but only the control system associated with brake 48 will be described. The pneumatic control system of FIG. 2 includes an air inlet line 70 connected between a suitable air supply source and an air reservoir tank 80, with line 70 having an air filter 72, a lubricator 74, a pressure regulator 76, and a pressure gauge 78 connected therein. A line 82 leads from tank 80 to a normally open, solenoid operated three-way valve 84 operated by solenoid 9B, and another line 86 extends from valve 84 to a junction point 88. During a normal, soft braking mode of operation, the air from junction 88 will pass through an adjustable variably restricted air flow control valve 90 to a junction point 92 and on to the disc brake assembly 48 for a soft application of the brakes to the drive shaft 44. The variable restricter valve 90 may be adjusted as desired to regulate the air flow therethrough and set the rate of increase of braking force to brake 48 during a normal welding cycle so that a desired time elapses between the opening of solenoid 9B and the application of the maximum braking force available for the pressure present in the pneumatic system.

The control system of FIG. 2 also includes an emergency circuit 94 for bypassing the flow control valve 90 when the brake 48 is to be applied under emergency conditions. Bypass circuit 94 includes a line 96 extending between junction points 88 and 92 and having located therein a normally open, solenoid operated three-way valve 98 operated by a solenoid 16B. In FIG. 2, the valves 84 and 98 are shown in their normally open, brake applying positions in which both solenoids 9B and 16B are de-energized. When valves 84 and 98 are closed, they function to vent lines 86 and 96 to release brake 48.

The electrical control circuitry for operating the solenoids 9B and 16B is shown in FIGS. 3 and 4, in which the positions of the respective electrical components are illustrated in a normally de-energized, power-off condition. To release brake 48 initially, electrical power is supplied to main leads 776 and 777, and current will flow from line 776 through the normally closed emergency stop switches 810, 812 and the time delay relay TDA7 to lead 777. When relay TDA7 is energized, normally open contacts TDA7-1 will be closed and relay CRA28 will be energized to close the normally open contacts CRA28-5 in FIG. 3 and CRA28-6 in FIG. 4. When contacts CRA28-5 are closed, current will flow from line 776 through contacts CRA28-5 and normally closed contacts CRA11-1. The current will also continue to flow through contacts CRA12-1, which are normally open, but which will have been closed by an associated relay operated in response to closure of a pair of pressure switches which close in response to a pressure buildup of the hydraulic fluid applied to the carrier 37. The operation and circuitry by which contacts CRA12-1 are closed are described in application Ser. No. 753,214. Relay CRA29 will then be energized to close the normally open contacts CRA29-1 in FIG. 4 to energize the solenoids 9A and 9B thereby actuating the valve 84 in the control circuit to brake 48 to a closed position to thereby release the brake. The valve 98 in the emergency bypass circuit 94 will already have been energized to its closed, brake release position upon closure of contacts CRA28-6 and energization of the solenoids 16A and 16B.

Consequently, the brake 48 will be released and drive shaft 44 rotated to rotate the spindle 13 before it is moved to approach the center section 12. A lamp 989 indicates when the brakes are released.

In a typical welding cycle, the rotating spindles 13 and 11 are then axially accelerated toward opposite ends of the center section 12, and are decelerated as they approach the center section so that they gently contact the center section. The axial thrust created by the pistons 32, 33, and 54, 55 is then materially increased to urge the rotating spindles against the center section immediately upon contact, and is then gradually increased from the abruptly increased thrust level. At this point, rotation fo the end spindles is stopped by application of brakes 48 and 69, and the axial thrust is abruptly increased again to a much higher level and maintained at that level until the welds, which are formed when the end spindles stop rotating, have cooled.

In the overall operation, the end spindles 13 and 11 are rotated for a predetermined period of time starting at the time the brakes 48 and 69 are released and until they are again applied after the end spindles have engaged the ends of the center section 12. In a normal welding cycle, the reapplication of the brakes is controlled by the opening of the normally closed contacts CRA11-1. These contacts are controlled by a relay which is energized in response to operation of a travel delay timer (not shown), the operation of which is initiated simultaneously with the initial release of the brakes as described in Ser. No. 753,214.

Thus, as contacts CRA11-1 are opened, relay CRA29 will be de-energized to open contacts CR29-1 and thereby de-energize solenoids 9A and 9B. De-energization of solenoid 9B will cause valve 84 to move to its normally open, brake applying position and air will flow from line 82 through the valve 84 onto junction 88. Since the valve 98 in the emergency by-pass circuit 94 is still closed because solenoid 16B is still energized, the air at junction 88 must pass through the flow control restrictor valve 90 on its way to the brake assembly 48. In this way, during the normal welding cycle, because of the predetermined adjustment of the variable flow restrictor in valve 90, the air supplied to the brake 48 will be at a reduced rate and a softer and slower braking action on the drive shaft 44 and the other drive components of the system will result. This is the normal soft mode of operation of the brake control system in which the speed control valve 90 is adjusted to suit the particular weld cycle in which the welding apparatus is being operated.

However, if at any time during operation of the apparatus, an emergency condition arises and it becomes necessary to immediately stop rotation of the drive system and the spindles, the brake control mechanism may be operated in its emergency mode of operation. To do this, either one or both of the emergency stop switches 810 and 812 in FIG. 3 will be opened to de-energize relay CRA28 which will cause contacts CRA28-5 and CRA28-6 to open.

Opening of contacts CRA28-5 will cause relay CRA29 to de-energize and thereby open contacts CRA29-1 to de-energize solenoids 9A and 9B. De-energization of solenoid 16B in FIG. 2 will then cause valve 98 to return to its normally open position and will thereby connect the junction points 88 and 92 via the by-pass line 96. Since a fluid path having no flow restriction such as valve 90 then becomes open from junction 88 to brake 48, the full air pressure present in the pneumatic system, and thus the full braking force available, is applied to brake 48 substantially instantaneously. This substantially instantaneous application of the maximum braking force serves to stop rotation of spindle 13 and its drive system within a shorter period of time than in the soft braking mode.

Thus, it is apparent that the described brake control system advantageously accomplishes the objects initially set forth by providing a first slow or soft mode of operation in which air is supplied to the brake systems via a variable flow, speed control valve which may be suitably adjusted to suit a particular weld cycle and which applies a soft braking to the drive components of the spindles in a manner sufficient to stop the rotation within a reasonable period of time suitable for the particular weld cycle without damaging any of the drive components. In addition, the emergency, fast mode of operation in which an unrestricted flow of air is applied to the pneumatically operated brake assemblies enables the rotating spindles and their respective drive systems to be stopped at a faster rate within a shorter period of time when emergency conditions arise.

What is claimed and desired to be secured by Letters Patent is:

1. Apparatus for frictionally welding two workpieces together comprising means for gripping said workpieces, power means capable of forcing said workpieces into intimate friction welding engagement, drive means for rotating one of said workpieces, braking means associated with said drive means for stopping rotation of said one workpiece, said braking means including a brake control system selectively operable in a normal first mode of operation in which said braking means are operable to brake said drive means to stop said rotation after a first elapsed time period and in an emergency second mode of operation to stop said rotation after a second shorter elapsed time period, said first and second modes being mutually exclusive.

2. The apparatus defined in claim 1, said brake control system comprising a fluid operated brake assembly associated with said drive means, a first fluid control circuit including adjustable valve means for passing a regulated flow of fluid to said brake assembly during a normal welding cycle, and a second control circuit for bypassing said adjustable valve means and for passing a greater flow of fluid to said brake assembly under emergency braking conditions.

3. The apparatus defined in claim 2, said first control circuit comprising fluid reservoir means, a first solenoid operated valve connected between said reservoir means and said adjustable valve means, said second control circuit including a second solenoid operated valve connected between said reservoir means and said brake assembly in bypassing relationship with said adjustable valve means, and electrical circuit means for operation said first and second solenoid valves when necessary to effect either normal or emergency braking of said drive means.

4. Apparatus for frictionally welding together an axle housing center section and two wheel bearing end sections comprising means for mounting said end sections in axial alignment with said center section held against rotation and said end sections being connected to be rotated by positive drive mechanism and to be displaced while rotating into abutment with said center section, brake means in the drive mechanism for each end section and a brake control system connected to simultaneously and similarly operate both of said brake means, said system comprising means whereby predetermined braking force is applied to stop rotation of said end in a first predetermined time period established point in a normal level of operation and bypass means selectively operable to stop rotation of said end sections in a second shorter predetermined time period.

* * * * *